(12) United States Patent
Semersky

(10) Patent No.: US 7,588,810 B2
(45) Date of Patent: Sep. 15, 2009

(54) CONTAINER HAVING FOAM LAYER

(75) Inventor: Frank E. Semersky, Toledo, OH (US)

(73) Assignee: Plastic Technologies, Inc., Holland, OH (US)

( * ) Notice: Subject to any disclaimer, the term of this patent is extended or adjusted under 35 U.S.C. 154(b) by 4 days.

(21) Appl. No.: 10/684,611

(22) Filed: Oct. 14, 2003

(65) Prior Publication Data

US 2004/0086703 A1    May 6, 2004

Related U.S. Application Data

(60) Provisional application No. 60/422,223, filed on Oct. 30, 2002.

(51) Int. Cl.
*B65D 39/08* (2006.01)
*B32B 3/26* (2006.01)

(52) U.S. Cl. ............... 428/36.5; 428/36.9; 428/36.91; 428/319.3; 428/319.7; 428/318.4; 428/316.6

(58) Field of Classification Search ............ 428/319.3, 428/319.7, 318.4, 316.6, 36.5, 36.9, 36.91
See application file for complete search history.

(56) References Cited

U.S. PATENT DOCUMENTS

| | | | |
|---|---|---|---|
| 3,684,633 A * | 8/1972 | Haase | 428/66.7 |
| 4,338,068 A | 7/1982 | Suh et al. | |
| 4,473,665 A | 9/1984 | Martini-Vvedensky et al. | |
| 4,533,578 A * | 8/1985 | Boyd et al. | 428/35.2 |
| 4,548,773 A | 10/1985 | Suh et al. | |
| 4,872,573 A * | 10/1989 | Johnson et al. | 215/347 |
| 4,923,723 A * | 5/1990 | Collette et al. | 428/35.7 |
| 5,149,579 A * | 9/1992 | Park et al. | 428/213 |
| 5,215,691 A * | 6/1993 | Bland et al. | 264/45.9 |
| 5,334,356 A | 8/1994 | Baldwin et al. | |
| 5,866,053 A | 2/1999 | Park et al. | |
| 5,919,547 A * | 7/1999 | Kocher et al. | 428/138 |
| 6,051,174 A | 4/2000 | Park et al. | |
| 6,223,945 B1 * | 5/2001 | Giblin et al. | 222/109 |
| 6,358,446 B1 * | 3/2002 | Clarke | 264/50 |
| 6,485,819 B2 * | 11/2002 | Hayes | 428/221 |

* cited by examiner

*Primary Examiner*—Hai Vo
(74) *Attorney, Agent, or Firm*—Fraser Clemens Martin & Miller LLC; Donald R. Fraser

(57) ABSTRACT

A container, comprises a first layer of plastic and a second layer of plastic contacting said first layer, the second layer of plastic being formed as a foam wherein the foam cells contain carbon dioxide.

36 Claims, No Drawings

CONTAINER HAVING FOAM LAYER

CROSS REFERENCE TO RELATED APPLICATION

This application claims the benefit of U.S. Provisional Patent Application Ser. No. 60/422,223 filed Oct. 30, 2002.

FIELD OF THE INVENTION

The present invention relates generally to a plastic container having a foam layer. More particularly, the invention is directed to a multi-layered plastic container including at least one layer of foam wherein the foam cells contain carbon dioxide.

BACKGROUND OF THE INVENTION

Biaxially oriented multi-layered bottles may be manufactured from plastic materials such as, for example, polyethylene terephthalate (PET) using a hot preform process, wherein a multi-layered preform is heated to its desired orientation temperature and drawn and blown into conformity with a surrounding mold cavity. The multi-layered preform may be prepared by any conventional process such as, for example, by coinjecting a preform comprising multiple layers of plastic or by injecting subsequent layers of plastic over a previously injection molded preform. Generally, multiple layers are used for food or carbonated beverage containers, to improve the oxygen or carbon dioxide diffusion barrier properties of the overall package.

The various layers of plastics in the prior art multi-layered containers are generally in intimate contact with one another, thereby facilitating the conduction of thermal energy through the walls of the containers. This allows the chilled contents of the container to quickly warm to the ambient temperature. Accordingly, such containers are often sheathed in, for example, a foamed polystyrene shell to impart thermal insulating properties to the container.

It would be desirable to prepare a multi-layered container having improved thermal insulating properties.

SUMMARY OF THE INVENTION

Accordant with the present invention, a container exhibiting the properties set forth above has surprisingly been discovered. The container comprises: a first layer of plastic; and a second layer of plastic contacting the first layer, the second layer of plastic formed as a foam.

DETAILED DESCRIPTION OF THE PREFERRED EMBODIMENT

The present invention is directed to a container comprising a first layer of plastic and a second layer of plastic contacting said first layer, said second layer of plastic formed as a foam wherein the foam cells are substantially filled with one of carbon dioxide and nitrogen.

The first and second layers of plastic may be the same or different, in composition, thickness, orientation, etc. Furthermore, the invention contemplates a container having any number (greater than one) of layers of plastics, as long as at least one of the plastic layers comprises a foam. Moreover, the invention contemplates the use of a cellular foam plastic layer wherein the foam cells contain not only carbon dioxide, but also one or more other gasses.

Suitable plastics from which the first and/or second plastic layers may be prepared include, but are not necessarily limited to, polyesters, acrylonitrile acid esters, vinyl chlorides, polyolefins, polyamides, and the like, as well as derivatives, blends, and copolymers thereof. A preferred plastic for one or both of the plastic layers is PET.

In addition to carbon dioxide, the foam cells may contain other gases typically used in processes for making cellular foam structures, including nitrogen, argon, and the like. Preferably, the amount of carbon dioxide, nitrogen, argon, or other gas present, alone or in combination, in the foam cells will be greater than about ten percent by weight. The amount of carbon dioxide, nitrogen, argon, or other gas and may substantially fill the foam cells, as desired. The foam layer acts as an effective thermal insulator, to retard the conduction of heat energy from the atmosphere to the chilled beverage within the container.

The multi-layered container may be produced from a multi-layered preform, by conventional blow molding techniques. The cellular foam plastic layer may be prepared coextensively with the other plastic layer by, for example, a coextrusion process, or the first plastic layer may be applied to or received by the foam plastic layer in a multi-step injection molding process.

Conventional processes for preparing plastic preform layers are well known in the art. The cellular foam plastic layer according to the present invention may be prepared by, for example, the polymer extrusion process set forth in U.S. Pat. No. 6,284,810 B1 to Burnham et al, which is herein incorporated in it entirety by reference thereto. This patent teaches the selective injection of a supercritical foaming gas comprising carbon dioxide into the polymer through an extruder shaping die. Thus, the entire cross section and thickness of the extrudate may be foamed, or merely a portion thereof. In this way, by foaming only a portion of the thickness of the extrudate, a preform having an inner or an outer foamed layer may be produced. Alternatively, the supercritical foaming gas may be injected only at a medial annular portion of the cross section of the extrudate, thus producing a preform comprising a foamed annular core surrounded by an inner and outer "skin" of non-foamed plastic.

One ordinarily skilled in the art will readily appreciate that the number and types of plastic layers used, and the various means, chemical and physical, used to produce a foam layer, can be varied over wide limits to produce a variety of contemplated multi-layered containers comprising a first layer of plastic and a second layer of plastic contacting said first layer, said second layer of plastics formed as a foam wherein the cells are substantially filled with one of carbon dioxide, nitrogen, argon, or other gas, according to the present invention.

From the foregoing description, one ordinarily skilled in the art can easily ascertain the essential characteristics of the invention, and without departing from its spirit and scope, can make various changes and modifications to adapt the invention to various uses and conditions.

What is claimed is:

1. A blow molded plastic container including a hollow body and an externally threaded neck providing communication with the hollow body, the container comprising:
   a first layer of plastic foam including foam cells;
   a second layer of plastic foam including foam cells; and
   a third layer of plastic disposed between said first layer and said second layer, wherein the hollow body and the threaded neck are formed from said first layer of plastic, said second layer of plastic, and said third layer of plastic.

2. The blow molded container according to claim 1, wherein said third layer of plastic comprises a polymer selected from the group consisting of polyesters, acrylonitrile acid esters, vinyl chlorides, polyolefins, polyamides, and derivatives, blends, and copolymers thereof.

3. The blow molded container according to claim 1, wherein said third layer of plastic comprises a polyester.

4. The blow molded container according to claim 1, wherein said third layer of plastic comprises polyethylene terephthalate.

5. The blow molded container according to claim 1, wherein said first layer of plastic and second layer of plastic comprise a polymer selected from the group consisting of polyesters, acrylonitrile acid esters, vinyl chlorides, polyolefins, polyamides, and derivatives, blends, and copolymers thereof.

6. The blow molded container according to claim 1, wherein said first layer of plastic and said second layer of plastic comprise a polyester.

7. The blow molded container according to claim 1, wherein said first layer of plastic and said second layer of plastic comprise polyethylene terephthalate.

8. The blow molded container according to claim 1, wherein said first layer and said second layer of plastic are formed from the same polymeric material.

9. The blow molded container according to claim 1, wherein said first layer of plastic and said second layer of plastic are formed from different polymeric materials.

10. The blow molded container according to claim 1, wherein said first layer of plastic, said second layer of plastic, and said third layer of plastic are formed from the same polymeric material.

11. The blow molded container according to claim 1, wherein said first layer of plastic, said second layer of plastic, and said third layer of plastic are formed from different polymeric materials.

12. The blow molded container according to claim 1, wherein the foam cells are formed from a gas comprising a gas selected from the group consisting of carbon dioxide, nitrogen, argon, air, and blends and derivatives thereof.

13. The blow molded container according to claim 1, wherein the foam cells contain a gas selected from the group consisting of carbon dioxide, nitrogen, argon, air, and blends and derivatives thereof.

14. The blow molded container of claim 1, wherein the container is blow molded from a multi-layered preform formed in a multi-step injection molding process.

15. The blow molded container of claim 1, wherein the container is blow molded from a multi-layered preform formed by a coextrusion process.

16. A multilayer preform including a hollow body and an externally threaded neck providing communication with the hollow body, the multilayer preform comprising:
  a first layer of plastic foam including foam cells;
  a second layer of plastic foam including foam cells; and
  a third layer of plastic disposed between said first layer and said second layer, wherein the hollow body and threaded neck are formed from said first layer of plastic, said second layer of plastic, and said third layer of plastic.

17. The multilayer preform according to claim 16, wherein said third layer of plastic comprises a polymer selected from the group consisting of polyesters, acrylonitrile acid esters, vinyl chlorides, polyolefins, polyamides, and derivatives, blends, and copolymers thereof.

18. The multilayer preform according to claim 16, wherein said third layer of plastic comprises a polyester.

19. The multilayer preform according to claim 16, wherein said third layer of plastic comprises polyethylene terephthalate.

20. The multilayer preform according to claim 16, wherein said first layer of plastic and said second layer of plastic comprise a polymer selected from the group consisting of polyesters, acrylonitrile acid esters, vinyl chlorides, polyolefins, polyamides, and derivatives, blends, and copolymers thereof.

21. The multilayer preform according to claim 16, wherein said first layer of plastic and said second layer of plastic comprise a polyester.

22. The multilayer preform according to claim 16, wherein said first layer of plastic and said second layer of plastic comprise polyethylene terephthalate.

23. The multilayer preform according to claim 16, wherein said first layer of plastic and said second layer of plastic are formed from the same polymeric material.

24. The multilayer preform according to claim 16, wherein said first layer of plastic and said second layer of plastic are formed from the different polymeric materials.

25. The multilayer preform according to claim 16, wherein said first layer of plastic, said second layer of plastic, and said third layer of plastic are formed from the same polymeric material.

26. The multilayer preform according to claim 16, wherein said first layer of plastic, said second layer of plastic, and said third layer of plastic are formed from different polymeric materials.

27. The multilayer preform according to claim 16, wherein the foam cells are formed from a gas comprising a gas selected from the group consisting of carbon dioxide, nitrogen, argon, air, and blends and derivatives thereof.

28. The multilayer preform according to claim 16, wherein the foam cells contain a gas selected from the group consisting of carbon dioxide, nitrogen, argon, air, and blends and derivatives thereof.

29. The multilayer preform of claim 16, wherein the preform is formed in a multi-step injection molding process.

30. The multilayer preform of claim 16, wherein the preform is formed by a coextrusion process.

31. The multilayer preform of claim 16, wherein said first layer and said third layer are formed by injection of a gas in a supercritical state into a single melt of plastic to produce a multilayered preform suitable for blow molding.

32. A reheat stretch blow molded container including a hollow body and an externally threaded neck providing communication with the hollow body, the container comprising:
  a first layer of plastic foam including foam cells;
  a second layer of plastic foam including foam cells; and
  a third layer of plastic disposed between said first layer and said second layer, wherein the hollow body and forming the threaded neck are formed from said first layer of plastic, said second layer of plastic, and said third layer of plastic.

33. A multilayer preform including a hollow body and an externally threaded neck providing communication with the hollow body, the multilayer preform comprising:
  a first layer of plastic foam including foam cells formed by injection of a gas in a supercritical state into a single melt of plastic;
  a second layer of plastic foam including foam cells formed by injection of a gas in a supercritical state into a single melt of plastic; and
  a third layer of plastic disposed between said first layer and said second layer, where the hollow body and the threaded neck are formed from said first layer of plastic, said second layer of plastic, and said third layer of plastic.

34. The preform of claim 33, wherein the supercritical gas comprises a gas selected from the group consisting of carbon dioxide, nitrogen, argon, air, and blends and derivatives thereof.

35. The preform of claim 33, wherein the preform is formed in a multi-step injection molding process.

36. The preform of claim 33, wherein the preform is formed by a coextrusion process.

* * * * *

UNITED STATES PATENT AND TRADEMARK OFFICE
CERTIFICATE OF CORRECTION

PATENT NO. : 7,588,810 B2  Page 1 of 1
APPLICATION NO. : 10/684611
DATED : September 15, 2009
INVENTOR(S) : Frank E. Semersky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-first Day of September, 2010

David J. Kappos
*Director of the United States Patent and Trademark Office*